United States Patent Office 3,644,480
Patented Feb. 22, 1972

---

3,644,480
2-SUBSTITUTED BENZENE ACETATE MANUFACTURE
Mahmoud S. Kablaoui, Wappingers Falls, N.Y., assignor to Texaco Inc., New York, N.Y.
No Drawing. Filed Dec. 3, 1970, Ser. No. 94,996
Int. Cl. C07c 69/14
U.S. Cl. 260—473 R
9 Claims

ABSTRACT OF THE DISCLOSURE

A method of preparing 2-substituted benzene acetate of the formula:

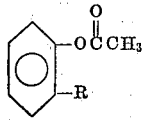

where R is a monovalent radical of up to 20 carbons selected from the group consisting of alkyl, cycloalkyl and —CH$_2$COO(CH$_2$)$_x$CH$_3$ where $x$ is an integer from 0 to 17 comprising contacting 2-substituted cyclohexanone of the formula:

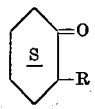

where R is as heretofore defined with a mixture of acetic anhydride, acetic acid and concentrated sulfuric acid at a temperature between about 30 and 140° C. utilizing a mole ratio of sulfuric acid to cyclohexanone of at least 2:1 and a mole ratio of acetic acid to acetic anhydride of at least about 1:1 and recovering said 2-substituted benzene acetate. The 2-substituted benzene acetate product can be readily converted to the corresponding 2-substituted phenol by hydrolysis.

BACKGROUND OF THE INVENTION

This invention relates to the preparation of 2-substituted benzene acetates which can be converted by standard hydrolysis techniques to corresponding alkylated phenols. The alkylated phenols find use as antioxidants in rubber (natural and synthetic) polymers, diesel fuels and gasoline. In the past, aromatization or substituted cyclohexanones was accomplished by passing the substituted cyclohexanone over catalyst such as palladium on carbon at high temperatures, e.g., 250° C. Phenols and aromatic hydrocarbons were the result through the loss of water molecules. Although this prior method does produce the alpha-substituted phenols, the yields are less than satisfactory since the high temperature results in a significant amount of thermal decomposition by-products.

SUMMARY OF THE INVENTION

I have discovered and this constitutes my invention a method of converting 2-substituted cyclohexanone into 2-substituted benzene acetates in improved yields at moderate temperature. The acetate product can be readily converted with negligible loss in improved yields by established hydrolysis techniques to the commercially attractive 2-substituted phenols. The process is relatively rapid, highly selective, relatively inexpensive and high yields of product accompanied by ease of isolation of the benzene acetate derivative result.

DETAILED DESCRIPTION OF THE INVENTION

Specifically the benzene acetate of the general formula:

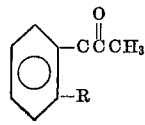

where R is a monovalent radical of up to 20 carbons selected from the group consisting of alkyl, cycloalkyl and —CH$_2$COO(CH$_2$)$_x$CH$_3$ where $x$ is 0 to 17 is prepared by contacting 2-substituted cyclohexanone of the formula:

where R is as heretofore defined with a mixture of acetic anhydride, acetic acid and concentrated sulfuric acid at a temperature between about 30 and 140° C. utilizing a mole ratio of sulfuric acid to substituted cyclohexanone of between 2:1 and about 5:1, and a mole ratio of acetic acid to acetic anhydride of between about 1:1 and 10:1. The reaction time is normally between about 0.2 and 12 hours, but in the final analysis reaction time particularly under commercial conditions will be dictated by economics of yield versus time. The reaction is normally conducted at atmospheric pressure but superatmospheric pressure is contemplated at temperatures above the boiling point of one or more of the reaction ingredients.

Conditions of agitation are preferably employed in order to facilitate ingredient contact and further an inert gas atmosphere such as nitrogen is advantageously employed. If necessary to facilitate contact and product recovery, diluent may be employed. Suitable examples of such diluents are excess acetic anhydride and acetic acid or volatilizable solvents such as toluene, benzene, heptane, hexane, chloroform, carbon tetrachloride, chlorobenzene and cyclohexane. The diluents if employed normally constitute between about 25 and 90 wt. percent of the reaction mixture.

The 2-substituted benzene acetate product may be recovered from the resultant reaction mixture by standard means. One such means of recovery comprises first removing excess acetic anhydride and acetic acid via fractional distillation, quenching the residue in water wherein the water content is between about 2 and 100 volumes/volume residue, said quenching conducted at a temperature desirably between about 0 and 50° C., extracting the resultant aqueous mixture with a water immiscible volatilizable solvent such as ether, benzene and chloroform, washing the solvent layer with an aqueous base, e.g., 0.1 to 7 wt. percent aqueous sodium bicarbonate, subjecting the wash solvent to fractional distillation to remove volatilizable solvent leaving the substituted benzene acetate as residue.

The conversion of the alpha-substituted benzene acetate to the phenolic derivatives may be accomplished by established hydrolysis techniques such as contacting the benzene acetate with an aqueous mineral acid (e.g., 0.1 to 1 wt. percent aqueous HCl) utilizing an acetate to aqueous acid weight ratio between about 1:2 and 1:100 at a temperature between about 30 and 100° C., most preferably under reflux conditions, until desired degree of hydrolysis is obtained followed by extracting the formed phenol from the aqueous acid solution with a water immiscible volatilizable solvent such as those listed above in connection wtih acetate purification and separating the phenol product from the solvent in the manner outlined in respect to the recovery of the benzene acetate intermediates.

In respect to the material feautres of the method invention, aromatization will not occur in the absence of either acetic anhydride or concentrated sulfuric acid. Further, aromatization will not occur in the method of the invention when the hydrocarbyl substituent is in a non-adjacent position. Still further, when the ratio of sulfuric acid to ketone is lower than 2:1 a substantial portion of undesired cyclohexenyl and styrene type acetates are formed thus sharply reducing the desired benzene acetate ysis was found to contain 2-methyl benzene acetate in a yield of 90 wt. percent.

Example II

The overall procedure of Example I was essentially repeated in several runs utilizing various 2-hydrocarbyl cyclohexanone reactants. Several comparative runs were made. The test data and results are subsequently reported below in Table I. Runs A, B, D, E and I represent the method of the invention. Comparative Runs C and H show the effect on yield when less than 2:1 $H_2SO_4$ to ketone reactant is employed. Comparative Runs F and G respectively demonstrate the materiality of the keto ingredient as defined.

TABLE I

| Run | A | B | C | D | E | F | G | H | I |
|---|---|---|---|---|---|---|---|---|---|
| Ingredients (g.): | | | | | | | | | |
| 2-ethyl cyclohexanone | 12.6 | | | | | | | | |
| 2-propyl cyclohexanone | | 14 | 14 | | | | | | |
| 2-butyl cyclohexanone | | | | 15.2 | | | | 15.2 | |
| 2-cyclohexyl cyclohexanone | | | | | 17.6 | | | | |
| 3-methyl cyclohexanone | | | | | | 11.2 | | | |
| Ethyl-2-cyclohexanone carboxylate | | | | | | | 17 | | |
| Ethyl 2-cyclohexanone methyl-carboxylate | | | | | | | | | 18.2 |
| $H_2SO_4$ | 20 | 20 | 16 | 20 | 20 | 20 | 20 | 16 | 20 |
| $Ac_2O$ | 75 | 75 | 75 | 75 | 75 | 75 | 75 | 75 | 75 |
| Acetic acid | 75 | 75 | 75 | 75 | 75 | 75 | 75 | 75 | 75 |
| Reaction conditions: | | | | | | | | | |
| Temp. (° C.) | 118 | 118 | 118 | 118 | 118 | 118 | 118 | 118 | 118 |
| Time (hr.) | 1 | 1 | 1 | 1 | 1 | 1 | 1 | 1 | 1 |
| Yield (wt. percent) benzene acetate: | | | | | | | | | |
| 2-ethyl | 70 | | | | | | | | |
| 2-propyl | | 70 | 40 | | | | | | |
| 2-butyl | | | | 70 | | | | 40 | |
| 2-cyclohexyl | | | | | 90 | | | | |
| 3-methyl | | | | | | 0 | | | |
| 2-ethyl carboxylate | | | | | | | 5 | | |
| 2-(1-prop-1-enyl) | | | 22 | | | | | | |
| 2-(1-but-1-enyl) | | | | | | | | 22 | |
| 2-ethylmethyl-carboxylate | | | | | | | | | 50 | yield. In addition, in the absence of acetic acid undesired diacetates are produced. When the ratio of acetic acid to acetic anhydride is above about 1:1 undesired diacetate products are essentially absent.

By the term "concentrated sulfuric acid" hereinbefore and hereinafter recited, an acid composition consisting of between about 95 and 100 wt. percent $H_2SO_4$ and between about 0 and 5 wt. percent $H_2O$ is intended.

Examples of the alpha-substituted cyclohexanone reactants contemplated herein are 2-methyl cyclohexanone, 2-ethyl cyclohexanone, 2-propyl cyclohexanone, 2-butyl cyclohexanone, 2-eicosyl cyclohexanone, 2-cyclopentyl cyclohexanone, 2-cyclohexyl cyclohexanone, 2-cyclooctyl cyclohexanone and ethyl - 2 - cyclohexanone-methyl-carboxylate. Corresponding 2-substituted benzene acetate products are 2-methyl benzene acetate, 2-ethyl benzene acetate, 2-propyl-benzene acetate, 2-butyl benzene acetate, 2-eicosyl benzene acetate, 2-cyclopentyl benzene acetate, 2-cyclohexyl benzene acetate, 2-cyclooctyl benzene acetate, and 2-ethyl methyl-carboxylate benzene acetate.

The following examples further illustrate the invention but are not to be construed as limitations thereof:

Example I

Into 300 mls. 3-necked flask equipped with a magnetic stirrer, stirring head, glass sparger and a thermometer, there were charged 11.2 grams of 2-methyl cyclohexanone, 75 grams acetic anhydride and 75 grams acetic acid. The mixture was then cooled to 10–15° C. and 20 grams of concentrated (98 wt. percent) sulfuric acid were added. After addition was complete, nitrogen was bubbled through and the reaction mixture was refluxed for 1 hour at 118° C. Unreacted acetic acid and acetic anhydride were then distilled under vacuum (20 mm. Hg) and the residue was quenched in 200 mls. of water and extracted 4 times with 50 mls. of ether. The ether layers were combined and washed with 50 mls. of 5 wt. percent aqueous carbonate, dried over anhydrous magnesium sulfate. The dried product was fractionally distilled to remove the ether leaving a residue which on chromatographic analysis

I claim:

1. A method of producing a 2-substituted benzene acetate of the formula:

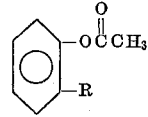

where R is a monovalent radical of up to 20 carbons selected from the group consisting of alkyl, cycloalkyl and —$CH_2COO(CH_2)_xCH_3$ where $x$ is an integer of from 0 to 17 comprising contacting 2-substituted cyclohexanone of the formula:

where R is as heretofore defined with a mixture of acetic anhydride, acetic acid and concentrated sulfuric acid at a temperature between about 30 and 140° C. utilizing a first mole ratio of sulfuric acid to said cyclohexanone of between 2:1 and about 5:1 and a second ratio of acetic acid to acetic anhydride of between 1:1 and 10:1 and recovering said benzene acetate from the resultant reaction mixture.

2. A method in accordance with claim 1 wherein said temperature is between about 80 and 120° C.

3. A method in accordance with claim 2 wherein said contacting is conducted in the presence of an inert gas.

4. A method in accordance with claim 3 wherein said cyclohexanone is 2-methyl cyclohexanone and said acetate is 2-methyl benzene acetate.

5. A method in accordance with claim 3 wherein said cyclohexanone is 2-ethyl cyclohexanone and said acetate is 2-ethyl benzene acetate.

6. A method in accordance with claim 3 wherein said cyclohexanone is 2-propyl cyclohexanone and said acetate is 2-propyl benzene acetate.

7. A method in accordance with claim 3 wherein said cyclohexanone is 2-butyl cyclohexanone and said acetate is 2-butyl benzene acetate.

8. A method in accordance with claim 3 wherein said cyclohexanone is 2-cyclohexyl cyclohexanone and said acetate is 2-cyclohexyl benzene acetate.

9. A method in accordance with claim 3 wherein said cyclohexanone is ethyl 2-cyclohexanone methyl-carboxylate and said acetate is 2-ethyl methyl-carboxylate benzene acetate.

References Cited

Doering et al., J. Am. Chem. Soc., vol. 71, pp. 2221–6 (1949).

JAMES A. PATTEN, Primary Examiner

U.S. Cl. X.R.

260—479 R, 624 R